United States Patent [19]
Harwood et al.

[11] Patent Number: 6,058,250
[45] Date of Patent: May 2, 2000

[54] BIFURCATED TRANSACTION SYSTEM IN WHICH NONSENSITIVE INFORMATION IS EXCHANGED USING A PUBLIC NETWORK CONNECTION AND SENSITIVE INFORMATION IS EXCHANGED AFTER AUTOMATICALLY CONFIGURING A PRIVATE NETWORK CONNECTION

[75] Inventors: Jonathan P. Harwood, Morganville; Thomas Kimmeth, Gladstone, both of N.J.; Kurt Nusbaum, Downers Grove, Ill.

[73] Assignee: AT&T Corp, Middletown, N.J.

[21] Appl. No.: 08/667,524

[22] Filed: Jun. 19, 1996

[51] Int. Cl.⁷ .............................. G06F 15/17; G06F 17/60
[52] U.S. Cl. ...................................... 395/200.57; 705/26
[58] Field of Search .................... 395/200.57, 200.58, 395/200.5, 200.51, 200.52, 653, 186, 187.01, 188.01; 705/26, 35, 39, 40, 44

[56] References Cited

U.S. PATENT DOCUMENTS

| | | | |
|---|---|---|---|
| 4,799,156 | 1/1989 | Shavit et al. | 705/26 |
| 5,485,370 | 1/1996 | Moss et al. | 395/200.47 |
| 5,528,490 | 6/1996 | Hill | 395/712 |
| 5,541,662 | 7/1996 | Adams et al. | 348/460 |
| 5,689,799 | 11/1997 | Dougherty et al. | 455/2 |
| 5,699,528 | 12/1997 | Hogan | 705/40 |
| 5,727,163 | 3/1998 | Bezos | 705/27 |
| 5,729,594 | 3/1998 | Klingman | 379/93.12 |
| 5,778,173 | 7/1998 | Apte | 395/187.01 |
| 5,799,285 | 8/1998 | Klingman | 705/26 |
| 5,822,737 | 10/1998 | Ogram | 705/26 |

OTHER PUBLICATIONS

Withnell, John, "BT Interactive TV Delivering Multimedia Services to the Home," IEE Colloq. (1996) No. 005: Impact of Multimedia Services on the Home Environment, 1996, pp. 2/1–2/2.

*Primary Examiner*—William M. Treat
*Assistant Examiner*—Andrew Caldwell

[57] ABSTRACT

A method is disclosed for providing an enhanced level of security for sensitive or proprietary information associated with information transactions in a public network, such as the Internet. In carrying out that method, an on-line information transaction is bifurcated between a generalized information access portion of such a transaction and an exchange of sensitive user information. With such a bifurcation, the generalized information access portion of the transaction, which generally would constitute the more substantial (in terms of network resources) portion of the transaction, would be handled via a non-secure network, usually a public network such as the Internet. The portion of the transaction involving sensitive user information, on the other hand, would be handled by a separate secure connection, such as a private network, or intranetwork. An important characteristic of this bifurcation arrangement is the provision of a means for automated reconfiguration of a user terminal as between accessing the generalized information via the non-secure network and access to the secure communications network for the exchange of sensitive user information. Such an automated reconfiguration will be carried out without the necessity for any action on the part of the user, and indeed will be largely invisible to the user.

34 Claims, 9 Drawing Sheets

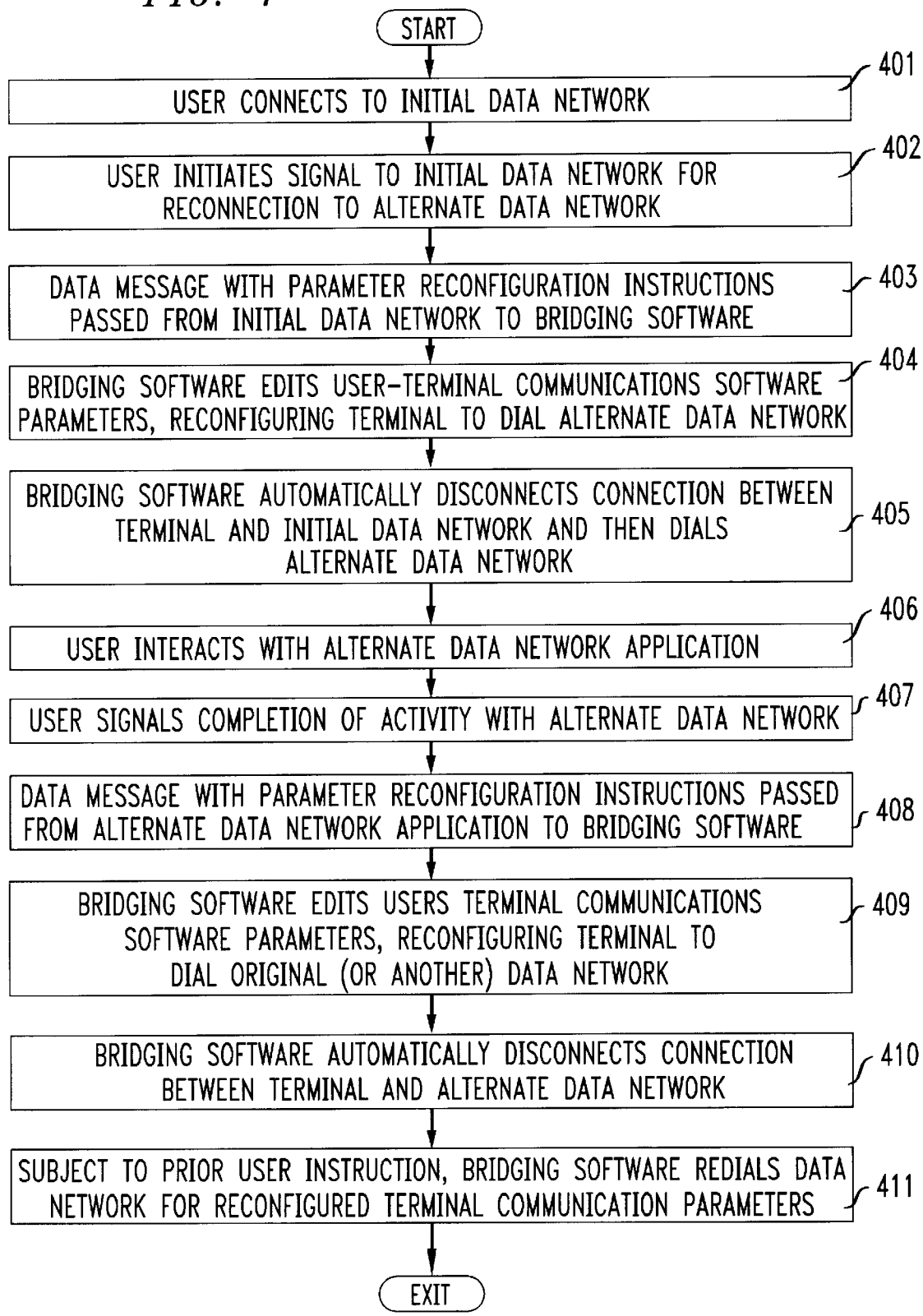

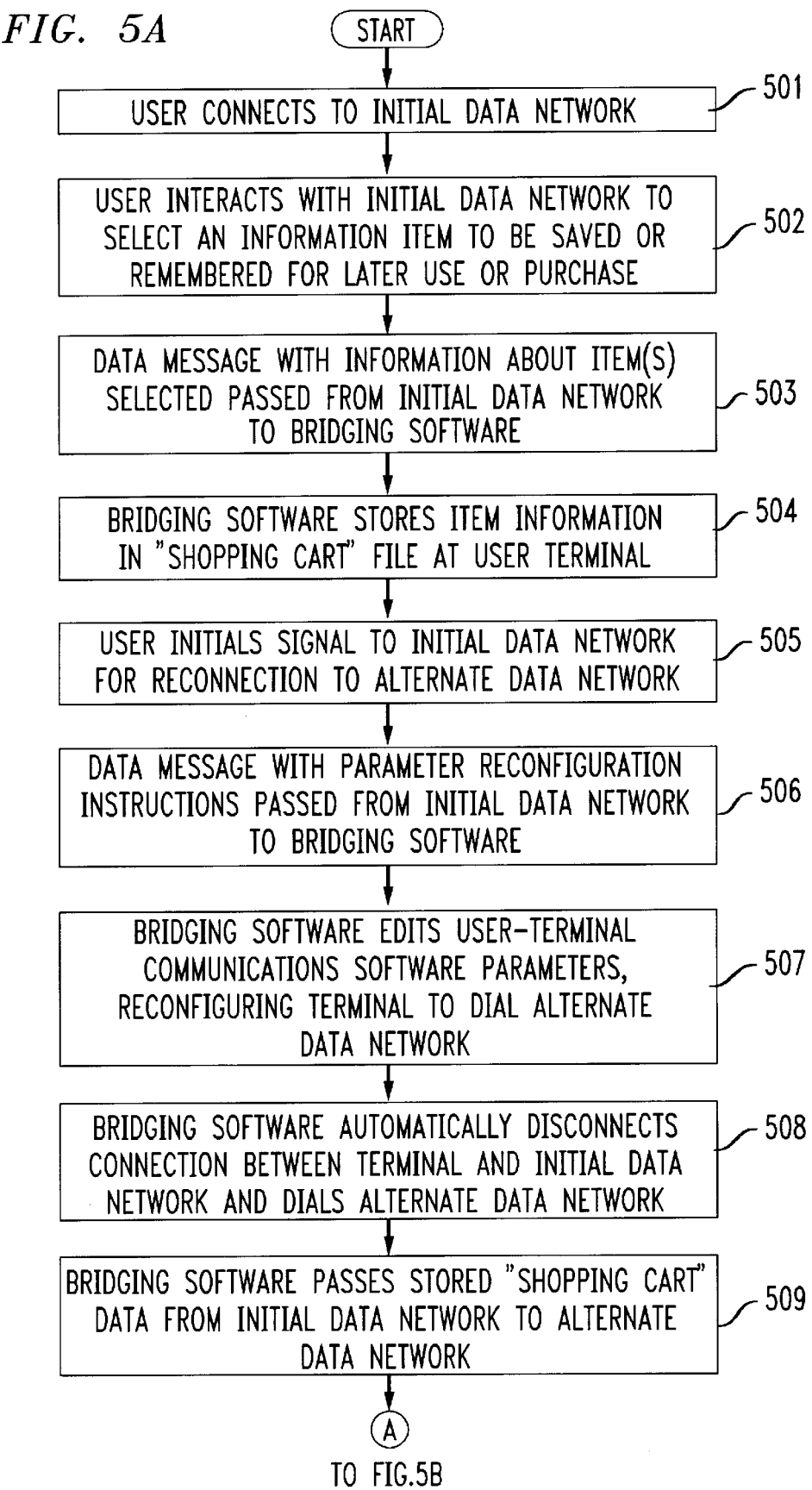

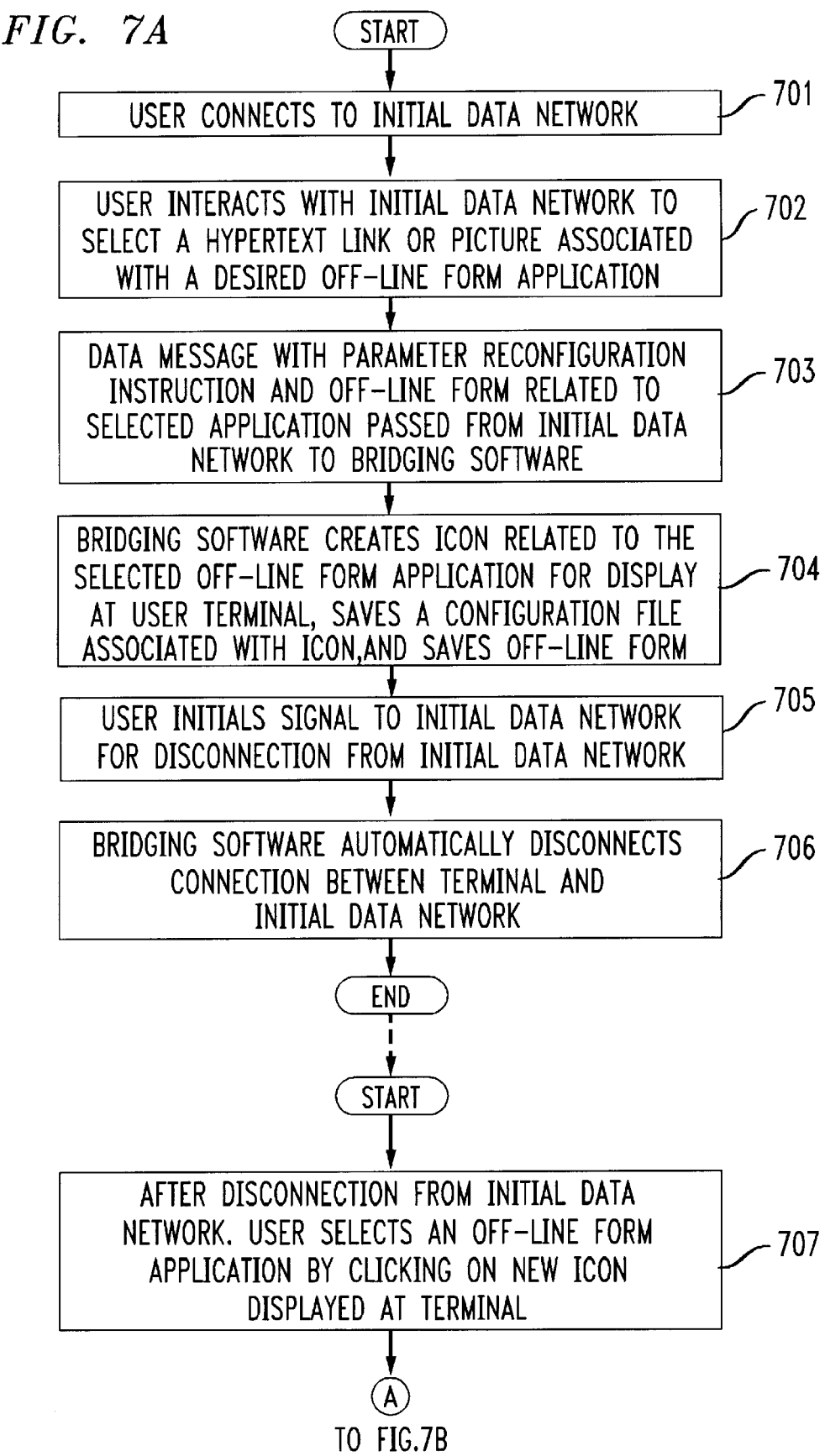

BIFURCATED TRANSACTION SYSTEM IN WHICH NONSENSITIVE INFORMATION IS EXCHANGED USING A PUBLIC NETWORK CONNECTION AND SENSITIVE INFORMATION IS EXCHANGED AFTER AUTOMATICALLY CONFIGURING A PRIVATE NETWORK CONNECTION

FIELD OF THE INVENTION

This invention is related to the field of data communications, and more particularly to a method and means for establishing an automatic reconfiguration of a user terminal among alternative tasks.

BACKGROUND OF THE INVENTION

With the increasing popularity of personal computers over the last several years has come a striking growth in transaction-oriented computer-to-computer communications (as opposed to bulk-data transfers among such computers). For convenience herein such transaction-oriented computer-to-computer communications will be described by the shorthand term "information transaction". That growth in the use of computers for such information transactions has unquestionably been fueled by the existence of an international infrastructure for implementing such data communications, known as the Internet. And, driven by the burgeoning demand for such information transaction services, the Internet has itself experienced explosive growth in the amount of traffic handled.

At least partly in response to that demand, a new level of accessibility to various information sources has recently been introduced to the Internet, known as the World Wide Web ("WWW"). The WWW allows a user to access a universe of information which combines text, audio, graphics and animation within a hypermedia document. Links are contained within a WWW document which allow simple and rapid access to related documents. Using a system known as the HyperText Markup Language ("HTML"), pages of information in the WWW contain pointers to other pages, those pointers typically being a key word (commonly known as a hyperlink word). When a user selects one of those key words, a hyperlink is created to another information layer (which may be in the same, or a different information server), where typically additional detail related to that key word will be found.

In order to facilitate implementation of the WWW on the Internet, new software tools have been developed for user terminals, usually known as Web Browsers, which provide a user with a graphical user interface means for accessing information on the Web, and navigating among information layers therein. A commonly used such Web Browser is that provided by Netscape.

The substantial growth in the use of computer networks, and particularly the WWW, for such information transactions, has predictably led to significant commercialization of this communications medium. For example, with the WWW, a user is not only able to access numerous information sources, some public and some commercial, but is also able to access "catalogs" of merchandise, where individual items from such a catalog can be identified and ordered, and is able to carry out a number of banking and other financial transactions. As will be obvious, such commercial transactions will typically involve sensitive and proprietary information, such as credit card numbers and financial information of a user. Thus, with the growth of commercial activity in the Internet, has also come a heightened concern with security.

It is well known that there are persons with a high level of skill in the computer arts, commonly known as "hackers", who have both the ability and the will to intercept communications via the Internet. Such persons are thereby able to gain unauthorized access to various sensitive user information, potentially compromising or misappropriating such information.

The vulnerability of such sensitive user information to misuse when so transmitted via the Internet is a phenomena which has only recently received wide public attention. Unless such security concerns can be quickly addressed and alleviated, the commercial development of this new communications medium may be slowed or even stalled altogether.

SUMMARY OF THE INVENTION

Accordingly, it is an object of the invention to provide an acceptable level of security for sensitive or proprietary information associated with information transactions in a public network, such as the Internet. That object is realized through an arrangement whereby an on-line information transaction is bifurcated between a generalized information access portion of such a transaction and an exchange of sensitive user information. With such a bifurcation, the generalized information access portion of the transaction, which generally would constitute the more substantial (in terms of network resources) portion of the transaction would be handled via a non-secure network, usually a public network such as the Internet. The portion of the transaction involving sensitive user information, on the other hand, would be handled by a separate secure connection, such as a private network, or intranetwork. An important characteristic of this bifurcation arrangement is the provision of a means for automated reconfiguration of a user terminal as between accessing the generalized information via the non-secure network and access to the secure communications network for the exchange of sensitive user information. Such an automated reconfiguration will be carried out without the necessity for any action on the part of the user, and indeed will be largely invisible to the user. In a further embodiment of the invention, a transfer of data is provided from a public to a private network, wherein data selected by a user from a public network site may be arranged and displayed at a user terminal and, subject to further user selection/confirmation activity, thereafter transferred to a private network.

BRIEF DESCRIPTION OF THE DRAWINGS

FIG. 4 depicts in flow chart form the basic jump capability of the methodology of the invention.

FIGS. 5A & 5B (generally designated collectively herein as "FIG. 5") depict in flow chart form the "shopping cart" capability of the methodology of the invention.

FIG. 7A & 7B (generally designated collectively herein as "FIG. 7") depict in flow chart form the off-line form capability of the methodology of the invention.

DETAILED DESCRIPTION

For clarity of explanation, the illustrative embodiment of the present invention is presented as comprising individual functional blocks. The functions these blocks represent may be provided through the use of either shared or dedicated hardware, including, but not limited to, hardware capable of executing software.

Figure 1:
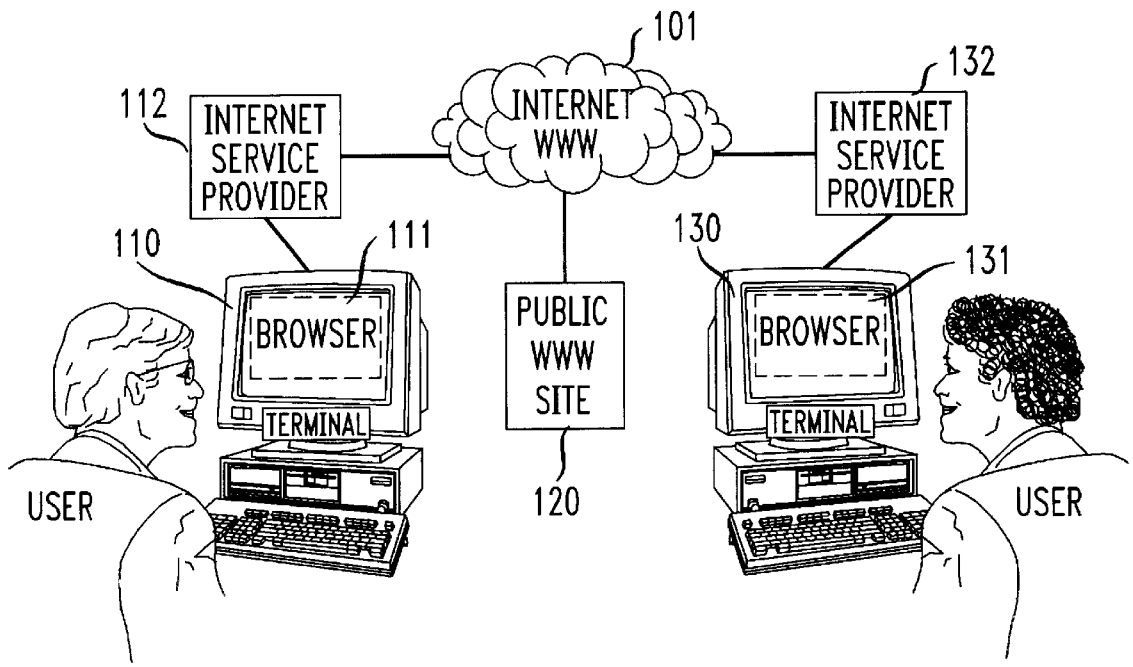
FIG. 1 depicts an illustrative case of information transactions carried out via a public network such as the Internet.

FIG. 1 depicts an illustrative case of information transactions carried out via the Internet. As seen in the figure, an exemplary user obtains access to the Internet by first connecting, via a Terminal 110 having an associated Browser 111, to an Internet Service Provider 112 selected by the user. That connection between the user and the Internet Service Provider will typically be made via the Public Switched Telephone Network (PSTN) from a modem associated with the user's Terminal to a network node in the Internet maintained by the selected Internet Service Provider.

Once the user has obtained access to the selected Internet Service Provider, an address is provided for connection to another user or other termination site and such a connection is made via the Internet to that destination location. As can be seen from the figure, communication via the Internet may be either user-to-user, as from Terminal 110 to Terminal 130, or from a user to a node representing an information source accessed via the Internet, such as Public Site 120.

It will of course be understood that the Internet provides service to a large number of users and includes a large number of such Public Sites, but the illustration provides the essential idea of the communication paths established for such Internet communication. It will also be understood that a number of service classifications are supported by the Internet, with the World Wide Web service, which represents a preferred embodiment for the public network aspect of the method of the invention, being one of the currently most heavily trafficked of such services.

Figure 2:
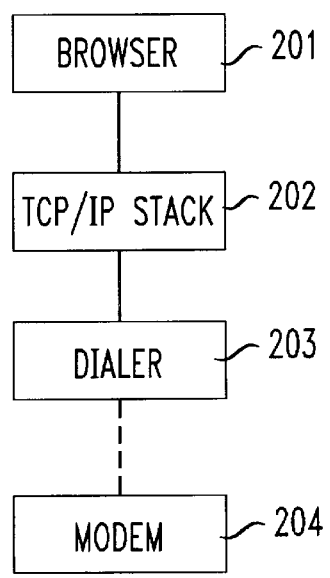
FIG. 2 shows the architecture of a browser as would typically be applied for accessing a hypermedia web page.

The Web Browser, such as depicted at 111, can be seen as a software application operating in conjunction with a user terminal (such as Terminal 110) which provides an interface between such a user terminal and the particular functionality of the WWW information site. The architecture of such a browser is generally described in terms of three main components, as illustrated in FIG. 2. At the top level is the Browser 201, which enables the acquisition of information pages from a WWW server (beginning, in all cases, with the "home page" for that server), for display at a display device associated with the terminal. The Browser also provides the necessary interface for the terminal with the HTML functionality used by the server to provide access to other linked information layers.

The second level of the browser architecture is the TCP/IP Stack 202, which handles the communications protocols used for connecting the terminal to the WWW server. The bottom level of this architecture is the Dialer 203, which typically handles the function of providing dialing and setup digits to a modem, as illustrated at 204, such a modem generally being a part of the terminal. Normally, upon receiving dialing and other setup information from the dialer, the modem would cause a connection to be made via the PSTN to the Internet Service Provider selected for that terminal.

After a connection is established in this manner to the Internet Service Provider, an address would be provided for the WWW information node sought to be contacted, a connection to that node made through the Internet, and the home page for that node caused to be displayed at the terminal's display device. A user would then select a key word in that home page, typically by clicking on the word with a mouse or similar device, and, upon transmission of that selection signal to the WWW server, a hyperlink would be created to the linked information layer and the open page of that layer would be caused to be displayed at the user terminal.

As explained above, serious questions have been raised in respect to the security of communications via the public Internet. (Note, that the discussion herein is focused on the Internet, and particularly the WWW functionality of the Internet, as a preferred embodiment of such public data communication networks generally, but the methodology of the invention will be applicable to any such network.) To address this problem, the methodology of the invention begins with a bifurcation of the information transaction between a user and the selected information transaction provider into a portion related to sensitive or proprietary user information, and other information comprising that transaction. With such a bifurcation, it becomes possible to provide substantial security for that proprietary information by use of an alternative communications path for that separated portion of the transaction via a private network, or intranetwork—i.e., a connection between a user's terminal and a secure serving node on that private network. It is anticipated that a coordination means will be established in respect to the management of information among the public and private network elements of the bifurcated information transaction.

In its basic form, this methodology may be carried out by the user terminal initiating a call via the Internet to a selected WWW node, and upon establishing connection to that node, proceeding with the desired information transaction up to the point where an exchange of sensitive or proprietary information were required. At that point the user terminal would be instructed by the WWW server to terminate that connection (i.e., hangup) and to place a new call to an identified private network server for the necessary exchange of sensitive information.

However, in order to accomplish such a dual-path transaction, it is necessary that the browser at the user terminal be reconfigured to provide the dialing, authorization (i.e., login and password), and other needed information for accessing the alternative private network, in order to implement the proprietary portion of the transaction. It will also usually be the case that, upon completion of that private-network transaction, the original dialer, stack and browser configurations will need to be restored, in order for the terminal to retain its normal Internet access functionality. Such a reconfiguration and subsequent restoral of the necessary parameters in the browser, stack and dialer is likely to be well beyond the capabilities of the average user.

Accordingly, as a further embodiment of the inventive methodology, an automated browser reconfiguration means is provided which interoperates with the browser. This browser reconfiguration means is described in detail hereafter and will be referred to as the "Bridging Software".

Figure 3:
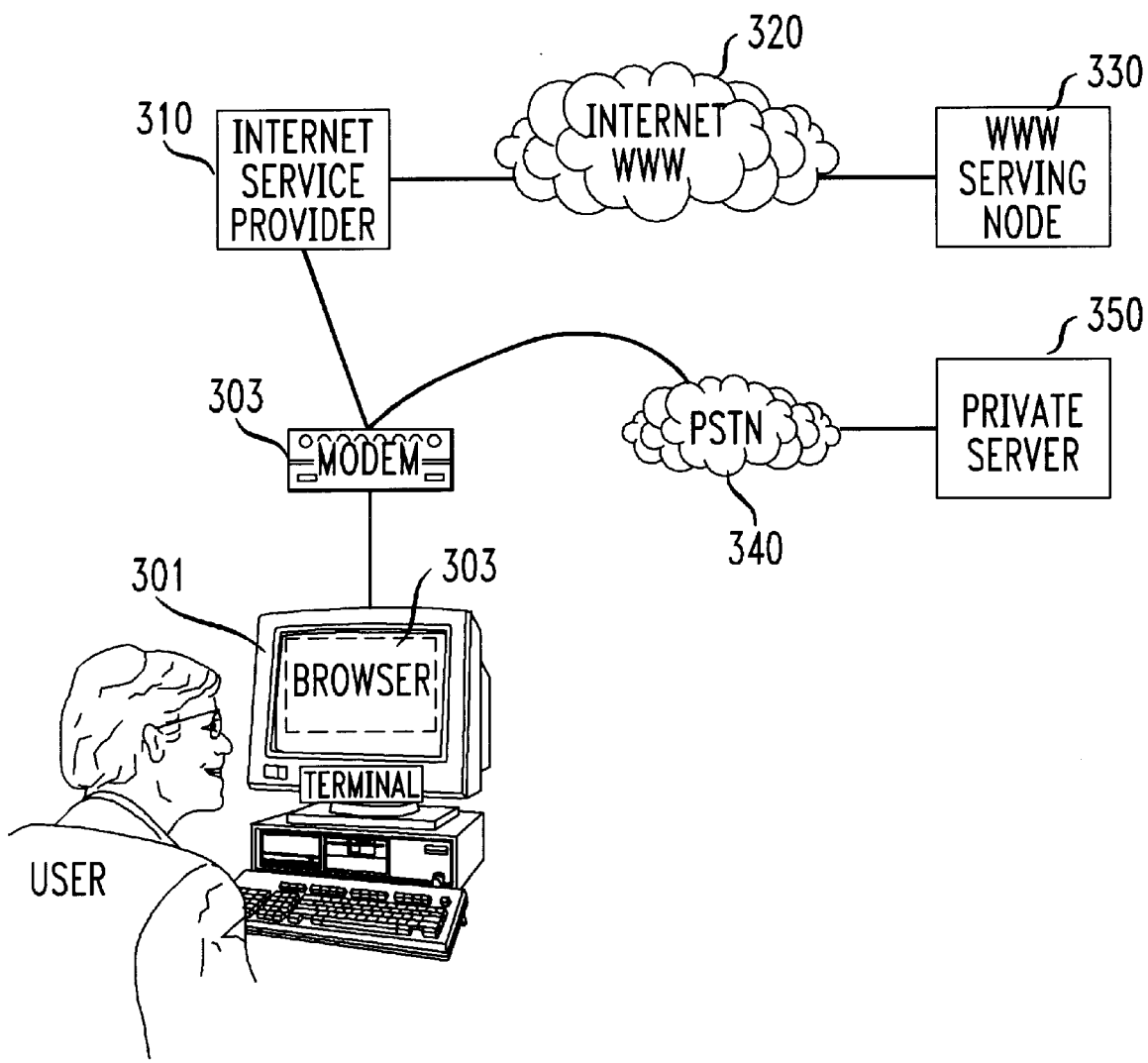
FIG. 3 illustrates the primary elements of the reconfigurable dual-path method of the invention.

FIG. 3 provides an illustration of the primary elements of the reconfigurable dual-path method of the invention. As seen in the figure, a first path comparable to the Internet link shown in FIG. 1, between User Terminal 301 and WWW Serving Node 330 (via Browser 302, Modem 303, Internet Service Provider 310, and Internet 320) is provided. However, an alternative path is now provided from the output of Modem 303 to Private Server 350. That path is illustrated as being via the PSTN, which is generally regarded as being highly secure, but an alternative dedicated or other more-secure path between the User Terminal 301 and the Private Server 350 could as well be provided. In keeping with the discussion above, Browser 302 shown in FIG. 3 would also include the Bridging Software installed as a helper application for implementing the automatic reconfiguration of the Browser.

In the operation of this system, a user would normally make an initial connection to an Internet application, such as the application represented by WWW Serving Node 330, which, e.g., might be a shopping application, a financial transaction, or the provision of an enrollment form for off-line preparation. After conducting all, or some portion of an information transaction short of an exchange of sensitive or proprietary information, including a capture by the user's terminal of needed information from the public site, a user provides a signal indicative of an end to that portion of that transaction. During the course of the public portion of the information transaction, specially configured files are sent from the WWW serving node to the Bridging Software associated with Browser 302. Such files contain instructions for the Bridging Software to store information-like products—e.g., for selected items from a catalog, forms for enrollment, or non-secure portions of a financial transaction, and reconfiguration information for dialing and logging into the private portion of the transaction. The Bridging Software then hangs up the Internet connection, edits the user terminal's browser, stack and dialer files to reconfigure the terminal to connect to the private server. Prior to automatic redialing of the new private site for the user, the Bridging Software may be instructed by the application operating at WWW Server Node 330 to display items chosen for purchase, or to display a form for the end-user to complete off-line before dialing the private application. Upon connecting to the private application and completing the transaction as to the user sensitive information in a private environment, the Bridging Software then restores the end-user software to the dialing and authorization parameters required to dial to the public Internet.

A particularly advantageous application of the automated reconfiguration and information transfer methodology of the Bridging Software is that it adds value to certain WWW servers which do not possess the Common Gateway Interface ("CGI") capability—i.e., a provision of specialized functions on the server beyond just displaying HTML files, and are accordingly unable to accomplish any transactional processing in respect to items selected by a user. In effect, such a non-CGI server, on its own, can only serve as a "billboard" for the items represented in its database.

However, with the collection and redelivery process of the Bridging Software, a data capture and processing mechanism can be implemented for servers operating in a non-CGI environment—such servers being incapable of more than the simple delivery of static data packets corresponding to available items. The data set enabled by the Bridging Software is a mechanism for augmenting such limited server capabilities by defining a flexible mechanism for the receipt, display, and delivery of arbitrary data from one site to another.

In such a scenario, the Bridging Software receives a "shopping cart" item list from the host as a data-set defined with a static MIME data packet associated with the Bridging Software. This information comprising the data-set may be updated, displayed to the user in a "read-only" fashion, or presented to the user for order selection.

During the process of interacting with the WWW server, a user may trigger HTML links resulting in additional MIME packets for the Bridging Software being delivered to the client. These packets allow items to be added and/or removed from the specified data set or presented to the user for local confirmation. The user will interact with a pop-up screen provided by the Bridging Software which presents the items available with product information, such as part number, description, unit cost, etc. The user identifies those items which are to be placed into the "shopping cart" and the quantity of items desired. Upon completion of the form, the Bridging Software stores the order in a format suitable for subsequent delivery to the private server site.

An additional feature provided by the methodology of the Bridging Software is an automated mechanism for providing compatibility with user terminals not previously having the Bridging Software included with the terminal's browser. To that end, the Bridging Software located at an accessed public network site initially checks to see if the browser counterpart for that software is loaded at the calling user terminal. If yes, the heretofore described processes of the Bridging Software go forward. If not however, a request is sent through the public host to download the Bridging Software to the calling terminal. After such a download, a helper application loads the Bridging Software to the terminal's browser.

I. Illustrative Embodiments

A variety of browser reconfiguration applications are supported by the automated browser reconfiguration means of the invention. Four essentially diverse capabilities of this invention, which support such applications, are described hereafter as illustrative embodiments of the invention.

A. Basic Jump Capabilities

In this configuration, which is illustrated in flow chart form in FIG. 4, an end-user is connected to a chosen WWW serving node (where a desired information product is made available) via a modem and an Internet browser associated with the user's terminal (Step 401 of FIG. 4). After conducting an information transaction with the selected WWW serving node for some interval (determined in relation to the specific application accessed), the user clicks on a hypertext link, or picture, to begin an automated process which will cause that public session to be terminated and a new connection established to an alternate private data network (Step 402).

In response to that user action, a data message containing parameter reconfiguration instructions is passed from the WWW server application to the Bridging Software at the user's terminal (Step 403). Upon receiving such instructions, the Bridging Software edits the user's on-line communications software parameters, reconfiguring that software to dial the alternate data network (Step 404). This reconfiguration is fully automatic and transparent to the user, and includes parameters such as modem dial number, login, password, and TCP/IP addresses. At that point, the Bridging Software causes the modem to disconnect the current data network connection, shutting down the browser, and to then dial the alternate private data network (Step 405).

With the establishment of a connection to the private server on the alternate data network, the user interacts with the alternate data network application as appropriate (Step 406), and after an interval completes his activity with the alternate data network and provides an indication of such completion (Step 407). A data message containing parameter reconfiguration instructions is then passed from the alternate data network application to the Bridging Software (Step 408).

At that point, the Bridging Software again edits the user's on-line communications software parameters, reconfiguring them to dial the original public data network, or another preselected network (Step 409). As with the first reconfiguration, this configuration is automatic and includes parameters such as modem dial number, login, password, and TCP/IP addresses. The Bridging Software automatically causes the current private data network to be disconnected by the modem (Step 410), and if appropriate, causes the original public data network to be redialed (Step 411). When such a reconnection to the public data network is established, the end-user would then continue his application in the public data network.

B. "Shopping Cart" Capability

Figure 5B:
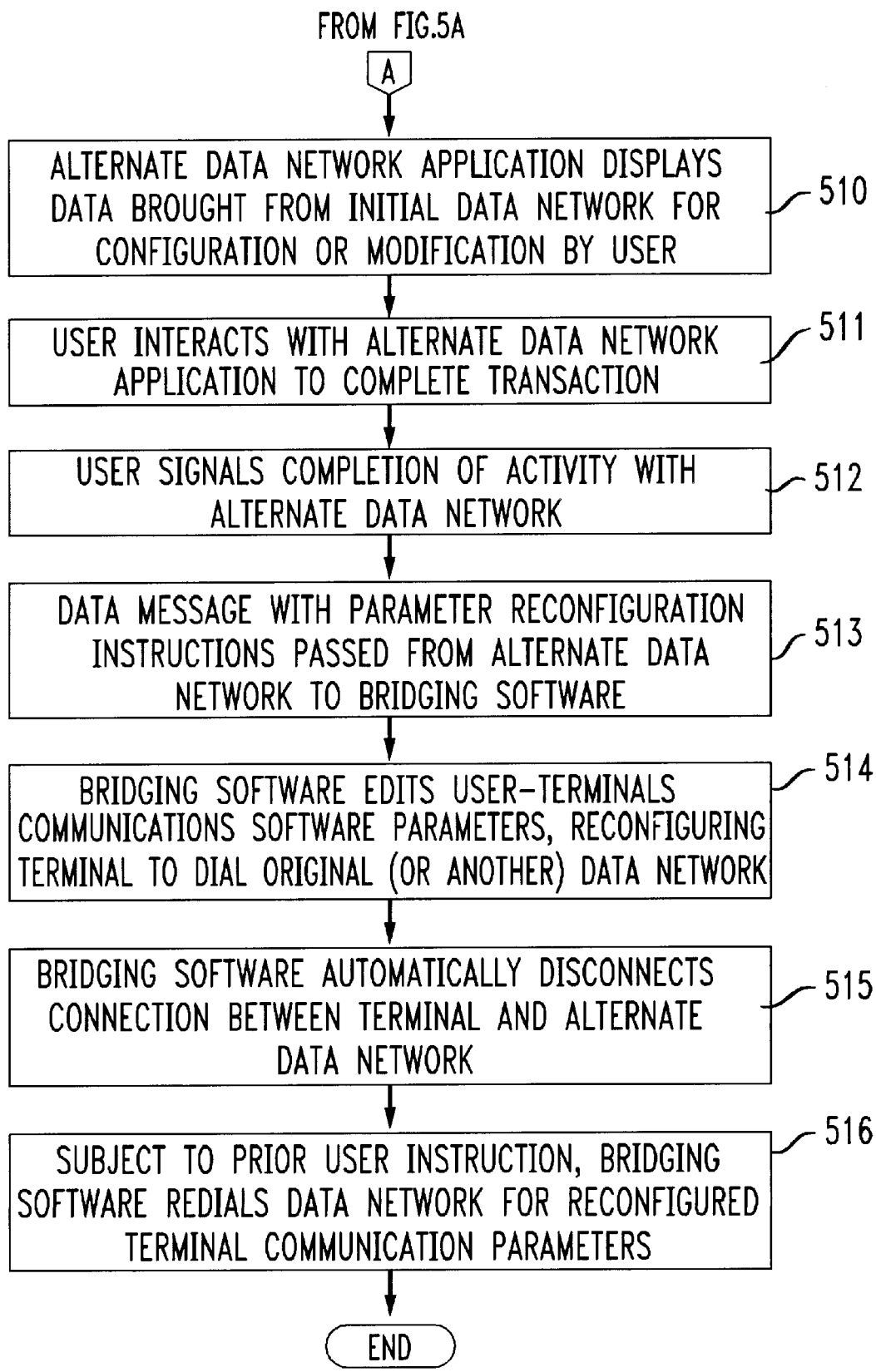

With this configuration, illustrated in flow chart form in FIG. 5, a user begins by establishing a connection to a WWW application (assuming for the moment that the application is non-CGI enabled) at a serving node for that application, using the Internet browser and modem associated with the user's terminal (Step 501 of FIG. 5). Upon finding an item in that application to be saved, or remembered for later consideration, or purchase, the user clicks on a hyper-text link, or picture, representing that item (Step 502). That application then sends a data message to the Bridging Software containing information about the items selected (Step 503) and such information is stored by the Bridging Software in the "shopping cart" file in the user's terminal (Step 504). Such selection, download and storage steps (i.e., steps 502, 503 & 504) are repeated for as many items as the user chooses to select. At any point after the Bridging Software has received the first set of item selection information, the user can instruct the Bridging Software to cause those selected items about which such information has been received to be displayed locally (at the user's terminal), where the user may review or edit (including deletion if desired) the collection of items theretofore selected. The application may also control display characteristics such as color and font for such locally displayed items. Note that in the case of a CGI-enabled application, the application itself will keep track of the items selected by the user and only download the totality of the selected items at the end of the selection process, and accordingly, the described local display option will not be applicable to such a CGI-enabled application.

At the point of completion of his "shopping", the user clicks on a hyper-text link or picture to "check out" (Step 505), which will begin a process of causing a jump to an alternate data network for the completion of sensitive portions of the transaction. To that end, a data message containing parameter reconfiguration instructions is passed from the WWW application to the Bridging Software (Step 506). It is to be noted that, as a security measure, information such as the new dial number, IP address, home page, configuration data (e.g., login, password, DNS address) may be passed over the public network in encrypted form.

Upon receiving such reconfiguration instructions, the Bridging Software edits the user's on-line communications software parameters, reconfiguring that software to dial the alternate data network (Step 507). This reconfiguration is fully automatic and transparent to the user, and includes parameters such as modem dial number, login, password, and TCP/IP addresses. At that point, the Bridging Software causes the modem to disconnect the current data network connection, shutting down the browser, and to then dial the alternate data network (Step 508).

The Bridging Software passes the stored "shopping cart" data captured from the WWW application to the alternate network application (Step 509), where that data may be displayed for the user, permitting the user to confirm and/or modify the data (Step 510). The user interacts with the alternate data network application as appropriate, and after an interval completes his activity with the alternate data network (Step 511) and thus, by providing an appropriate completion signal to the application, completing the private portion of the information transaction (Step 512). A data message containing parameter reconfiguration instructions is then passed from the alternate data network application to the Bridging Software (Step 513).

The Bridging Software, at this point, again edits the user's on-line communications software parameters, reconfiguring them to dial the original (or another pre-defined) data network (Step 514). As with the first reconfiguration, this configuration is automatic and includes parameters such as modem dial number, login, password, and TCP/IP addresses. The Bridging Software automatically causes the current private data network to be disconnected by the modem (Step 515), and if appropriate, causes the original public data network to be redialed (Step 516). When such a reconnection is established to the point in the public data network where the user had left off to handle the secured aspects of his information transaction, the user would then continue his application in the public data network.

C. Stored Configuration Capabilities

Figure 6A:
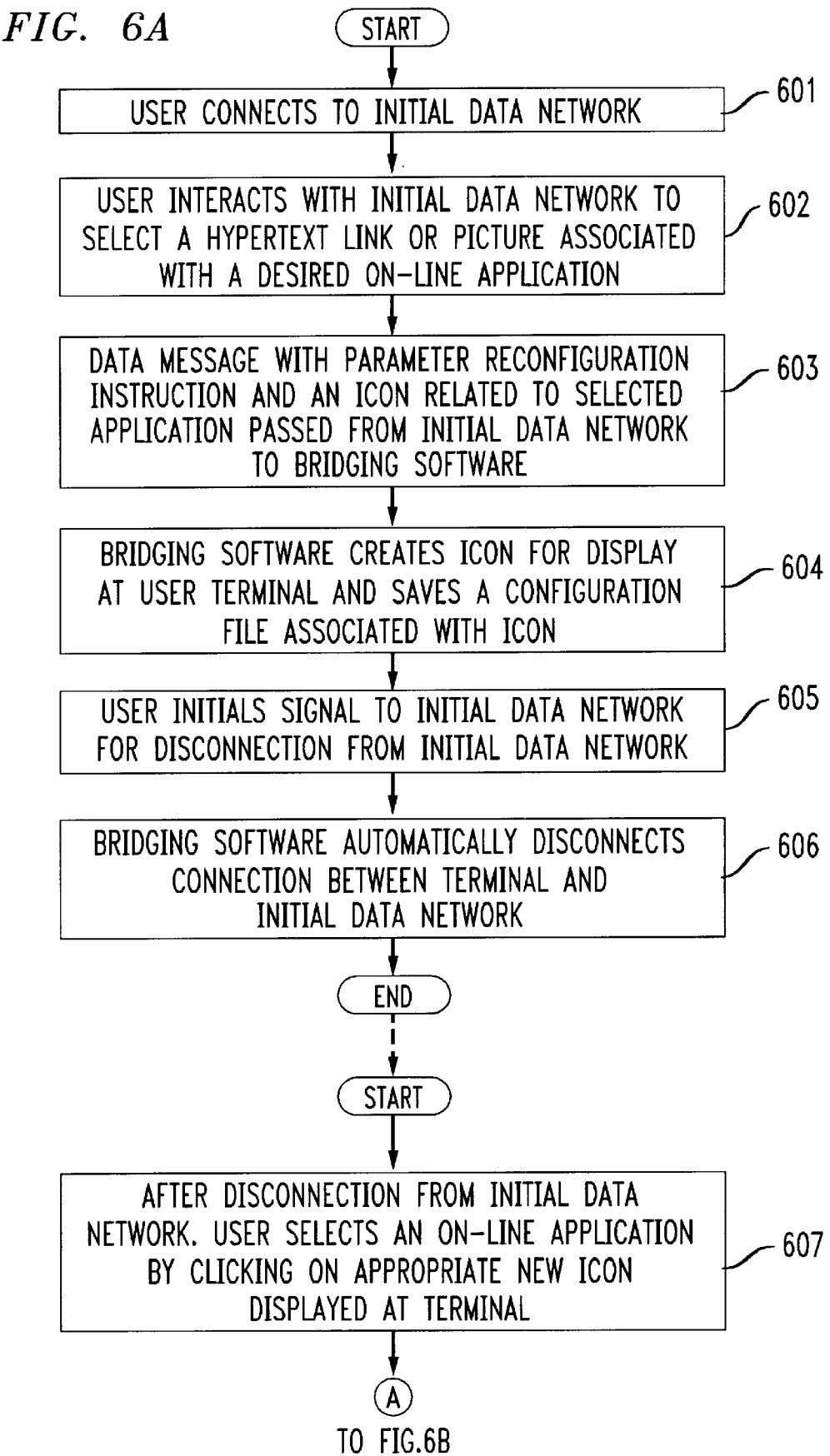
FIG. 6A & 6B (generally designated collectively herein as "FIG. 6") depict in flow chart form the stored configuration capability of the methodology of the invention.
Figure 6B:
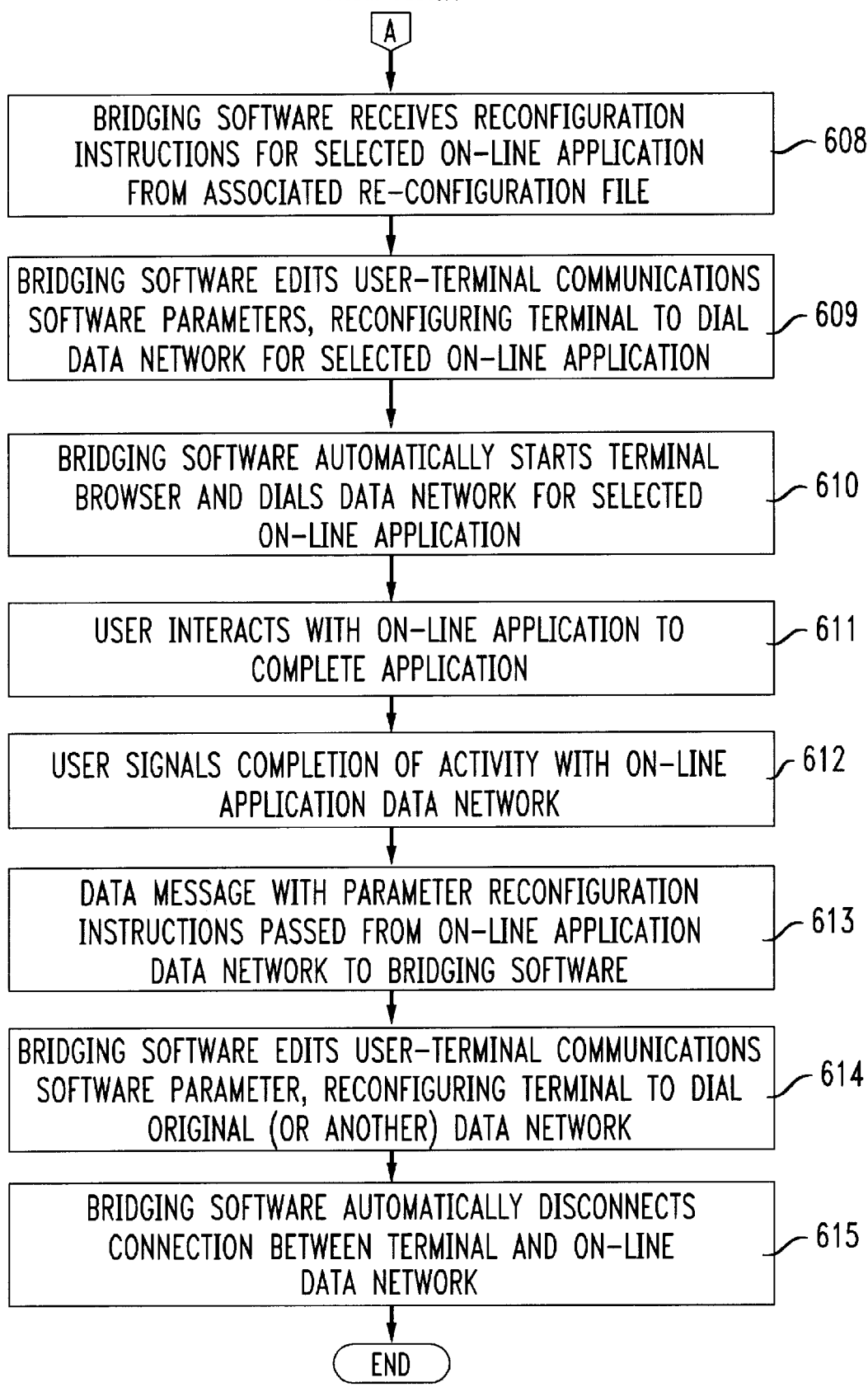

For this configuration, depicted in flow chart form in FIG. 6, an end-user is connected to a chosen WWW serving node (where a desired information product is made available) via a modem and an Internet browser associated with the user's terminal (Step 601 of FIG. 6). The user selects a hypertext link or picture associated with the WWW application by clicking on such link or picture (Step 602). A data message containing parameter reconfiguration instructions and an application icon (related to the selected hypertext link or picture) is passed from the WWW application to the Bridging Software (Step 603).

The Bridging Software creates an icon for display at the user's terminal, and saves a Bridging Software configuration file that is associated with that icon (Step 604). Such Bridging Software actions are automatic and multiple selections may be captured in this manner. At this point the user may continue the on-line session, or, if all desired selections have been made, a signal is provided from the user that the session should be discontinued (Step 605). The Bridging Software then automatically disconnects the current data network connection (Step 606).

After disconnecting from the WWW application, and following an interval determined by the user, a new application is selected by the user by clicking on the appropriate new icon displayed at the user's terminal (Step 607). The Bridging Software receives the reconfiguration instructions from the file associated with the selected icon (Step 608).

The Bridging Software edits the user's on-line communications software parameters, reconfiguring that software to dial the alternate data network (Step 609). The Bridging Software then automatically starts the user's Internet browser software and causes the alternate network application to be dialed by the modem associated with that terminal (Step 610). Upon establishing a connection to the alternate network, the user interacts with that application and completes the transaction to the user's satisfaction (Step 611). After a signal is sent to the alternate network indicating such completion of the user's activity (Step 612), a data message containing parameter reconfiguration instructions is passed from the alternate data network application to the Bridging Software (Step 613). That Software then causes the user's terminal configuration parameters to be reset (Step 614) and the alternate data network to be automatically disconnected (Step 615).

D. Off-Line Form Capability

Figure 7B:
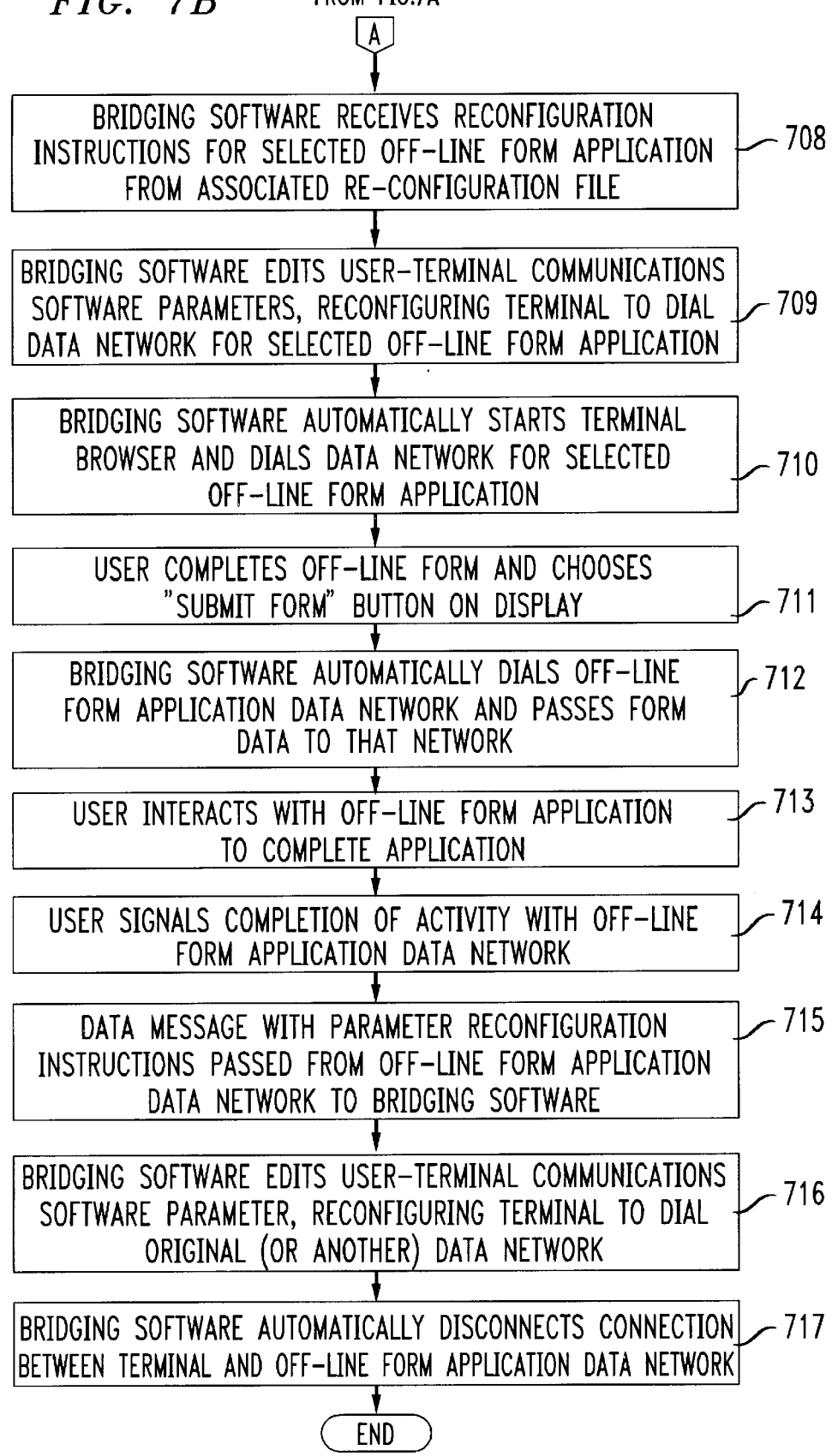

In this configuration, depicted in flow chart form in FIG. 7, an end-user is connected to a chosen WWW serving node (where a desired information product is made available) via a modem and an Internet browser associated with the user's terminal (Step 701 of FIG. 7). The user selects a hypertext link or picture associated with an off-line form application— an exemplary such form being an HTML-based form—by clicking on such link or picture (Step 702). A data message containing parameter reconfiguration instructions for the Bridging Software, the selected off-line-form application, and an optional icon (related to the selected hypertext link or picture) is passed from the WWW application to the Bridging Software (Step 703). Note that the selected off-line form may be for either single or multiple use.

In the case of a delayed or multiple use of the selected form, the Bridging Software may create an icon for display at the user's terminal, and will save a Bridging Software configuration file that is associated with that icon (Step 704). The form in question is also saved on the user's terminal. Such Bridging Software actions are automatic. At this point the user may continue the on-line session, or, if all desired selections have been made, a signal is provided from the user that the session should be discontinued (Step 705). The Bridging Software then automatically disconnects the current data network connection (Step 706).

After disconnecting from the WWW application, two cases are to be considered as to the further processing of the selected form: (1) an immediate single use of the form and (2) either a delayed or multiple use of the form. In the first case, the Bridging Software edits the user's on-line communications software parameters, reconfiguring that software to dial the alternate data network. The Bridging Software then automatically starts the user's Internet browser software which is caused to display the off-line form. The user then completes the off-line form and chooses a "Submit Form" button displayed at his terminal.

In the second case, the Bridging Software will have created an icon for display at the user's terminal and saved a Bridging Software configuration file associated with that icon. Following an interval determined by the user, the off-line-form application is started by the user by clicking on the new form icon displayed at the user's terminal (Step 707). The Bridging Software receives the reconfiguration instructions from the file associated with the selected icon (Step 708).

The Bridging Software edits the user's on-line communications software parameters, reconfiguring that software to dial the alternate data network (Step 709). The Bridging Software then automatically starts the user's Internet browser software which is caused to display the off-line form (Step 710). The user then completes the off-line form and chooses a "Submit Form" button displayed at his terminal (Step 711).

In either the first or second case, following activation of the "Submit Form" button, the alternate network application is then caused to be dialed by the Bridging Software. Upon establishing a connection to the alternate network, the form data is passed to the alternate network (Step 712). The user then interacts with that application and completes the application (Step 713). After a signal is sent to the alternate network indicating such completion of the user's activity (Step 714), a data message containing parameter reconfiguration instructions is passed from the alternate data network application to the Bridging Software (Step 715). That Software then causes the user's terminal configuration parameters to be reset (Step 716) and the alternate data network to be automatically disconnected (Step 717).

Conclusion

A system and method has been described for the automatic switching of an information transaction between two or more alternate networks. This functionality, which incorporates a reconfiguration means designated herein as the Bridging Software, supports the movement of application specific data from one on-line environment to another. Among potential applications of this process for passing data between different environments are: selected items for purchase ("shopping cart"), captured data from forms, and other server captured data such as web pages visited.

The Bridging Software reconfiguration means is intended to work with various Web Browser software implementations, including the Netscape Personal Edition (NPE) Software for Windows 3.1 and 3.11, and which represents a working embodiment for the invention. The Bridging Software installs itself as a helper application within the browser application and utilizes a special MIME type configuration file to pass reconfiguration and "shopping cart" information from the server to the client software.

When an application requires a user to re-connect to a private application, a reconfiguration file is passed to the Bridging Software helper application via a CGI script or simple hyper-text link. The helper application disconnects the current data connection, reconfigures the dial parameters (dial #, login password, DNS address, and home page) and initiates the dial program so the end-user can access the private application.

When the end-user connects to the private application, the Bridging Software reconfiguration means provides the new "private server" application with data collected from the "public server", and the application resumes in a private, secure environment.

The Bridging Software allows both short term and long term storage of dial configurations. Configurations passed to the Bridging Software can be designated as single use configurations and discarded after the application has terminated, or saved and displayed to the end-user as a dial choice by the Bridging Software.

Although the present embodiment of the invention has been described in detail, it should be understood that various changes, alterations and substitutions can be made therein without departing from the spirit and scope of the invention as defined by the appended claims. In particular, it is noted that, while the invention has been primarily described in terms of a preferred embodiment based on an automatic reconfiguration between a public and a private data network, any the methodology of the invention will be equally applicable to any set of alternate networks.

We claim:

1. A method for managing a transaction via a communications path between a terminal device and a serving node in a data network, said method comprising the steps of:

establishing an initial communications path via a first connection between said terminal device and a serving node in a first data network;

receiving information from said serving node in said first data network for effecting a reconfiguration of said communications path for said transaction from said first connection in said first data network to a second connection in a second data network; and automatically connecting said terminal device to a serving node in said second data network via said second connection;

wherein said step of automatically connecting includes the step of automatically disconnecting said first connection prior to implementation of said second connection.

2. The method for managing a transaction of claim 1 including the further step of recognizing a signal to reconfigure said communications path from said first connection to said second connection.

3. The method for managing a transaction of claim 1 wherein said serving nodes in said first and said second data networks are manifested in a common node.

4. The method for managing a transaction of claim 1 wherein said step of receiving information includes the further step of effecting said reconfiguration of said communications path.

5. The method for managing a transaction of claim 1 including the further steps of:

automatically disconnecting said second connection in response to a user signal; and reconfiguring said terminal device to enable, in response to user instruction, an implementation of a connection via an identified data network.

6. The method for managing a transaction of claim 5 wherein said step of automatically reconfiguring said terminal device includes the step of effecting said implementation of said connection via said identified data network.

7. A method for managing a transaction via a communications path between a terminal device and a serving node in a data network, said method comprising the steps of:

establishing an initial communications path via a first connection between said terminal device and a serving node in a first data network;

selecting at least one information item from a data base of said information items provided at said serving node in said first data network;

causing said selected information items to be downloaded to said terminal device via said first connection;

receiving information from said serving node in said first data network for effecting a reconfiguration of said communications path for said transaction from said first connection in said first data network to a second connection in a second data network; and automatically connecting said terminal device to a serving node in said second data network via said second connection;

wherein said step of automatically connecting includes the step of automatically disconnecting said first connection prior to implementation of said second connection.

8. The method for managing a transaction of claim 7 including the further step of recognizing a signal to reconfigure said communications path from said first connection to said second connection.

9. The method for managing a transaction of claim 7 wherein said serving nodes in said first and said second data networks are manifested in a common node.

10. The method for managing a transaction of claim 7 wherein said step of causing said selected information items to be downloaded includes the further step of causing said selected information items to be displayed at said terminal device.

11. The method for managing a transaction of claim 10 wherein said displayed selected items can be edited by a user at said terminal device.

12. The method for managing a transaction of claim 10 wherein display characteristics for said displayed selected items can be controlled at said terminal device.

13. The method for managing a transaction of claim 7 wherein said step of receiving information includes the further step of effecting said reconfiguration of said communications path.

14. The method for managing a transaction of claim 7 wherein said step of automatically connecting includes the step of uploading said selected information items from said terminal device to said serving node in said second data network via said second connection.

15. The method for managing a transaction of claim 7 including the further steps of:

automatically disconnecting said second connection in response to a user signal; and reconfiguring said terminal device to enable, in response to user instruction, an implementation of a connection via an identified data network.

16. The method for managing a transaction of claim 15 wherein said step of automatically reconfiguring said terminal device includes the step of effecting said implementation of said connection via said identified data network.

17. A method for managing a transaction via a communications path between a terminal device and a serving node in a data network, said method comprising the steps of:

establishing an initial communications path via a first connection between said terminal device and a serving node in a first data network;

identifying at least one data network application from a data base of said data network applications provided at said serving node in said first data network;

receiving information from said serving node in said first data network for reconfiguring said terminal device for implementation of a communication path via an alternate connection between said terminal device and at least one of said identified data network applications in a second data network; and in response to a selection signal from a user, automatically connecting said terminal device to a selected one of said identified data network applications via said alternate connection;

wherein said step of automatically connecting includes the step of automatically disconnecting said first connection prior to implementation of said alternate connection.

18. The method for managing a transaction of claim 17 wherein said selected data network application is operated at a serving node in said second data network.

19. The method for managing a transaction of claim 18 wherein serving nodes in said first and said second data networks are manifested in a common node.

20. The method for managing a transaction of claim 17 including the further steps of:

automatically disconnecting said alternate connection in response to a user signal; and reconfiguring said terminal device to enable implementation of a pre-selected connection between said terminal device and an identified data network.

21. The method for managing a transaction of claim 20 wherein said step of automatically reconfiguring said terminal device includes the further step of effecting said implementation of said pre-selected connection.

22. A method for managing a transaction via a communications path between a terminal device and a serving node in a data network, said method comprising the steps of:

establishing an initial communications path via a first connection between said terminal device and a serving node in a first data network;

selecting an off-line form application from a data base provided at said serving node in said first data network;

receiving information from said serving node in said first data network for reconfiguring said terminal device for implementation of a communication path via a second connection between said terminal device and said selected off-line form application in a second data network; and in response to a selection signal from a user, automatically connecting said terminal device to said selected off-line form applications;

wherein said step of automatically connecting includes the step of automatically disconnecting said first connection prior to implementation of said second connection.

23. The method for managing a transaction of claim 22 including the further step of downloading from said serving node in said first data network to said terminal device of an off-line form related to said off-line form application.

24. The method for managing a transaction of claim 22 including the further step of uploading said downloaded off-line form from said terminal device to said selected off-line form application, after processing by a user.

25. The method for managing a transaction of claim 22 including the further steps of:

automatically disconnecting said connection to said selected off-line form application in response to a user signal; and reconfiguring said terminal device to enable implementation of a pre-selected connection between said terminal device and an identified data network.

26. The method for managing a transaction of claim 25 wherein said step of automatically reconfiguring said terminal device includes the further step of effecting said implementation of said pre-selected connection.

27. The method for managing a transaction of claim 22 wherein said selected off-line form application is operated at a serving node in said second data network.

28. The method for managing a transaction of claim 27 wherein serving nodes in said first and said second data networks are manifested in a common node.

29. A method for managing connections between a terminal device and at least one information source/processor wherein at least two of said connections are implemented via separate communications networks, comprising the steps of:

recognizing a signal for connection to an information source/processor via a communications network other than a communications network for which a predetermined connection is configured, said recognizing step occurs at a point when said terminal device is connected to a given source/processor;

causing said terminal device to implement a connection to said information source/processor via said other communications network;

upon termination of said information source/processor connection via said other communications network, automatically reconfiguring a connection criteria in said terminal device to enable said terminal device to implement, in response to user instruction, a connection via an alternative one of said communications networks; and causing the other source/processor to download to said terminal device configuration data for enabling said step of automatically restoring a prior connection criteria in said terminal device.

30. The method for managing connections of claim 29 including the further step of causing said given source/processor to download to said terminal device configuration data for enabling said step of causing said terminal device to implement a connection to said other information source/processor.

31. The method for managing connections of claim 29 wherein information items may be selected by a user at said terminal device from said given source/processor, and including the further step of causing said selected information items to be downloaded from said source/processor to said terminal device.

32. The method for managing connections of claim 31 wherein said step of causing said terminal device to implement a connection includes the further step of uploading said selected information items from said terminal device to said other information source/processor.

33. The method for managing connections of claim 32 wherein said selected information items are processed by said user at said terminal device prior to uploading to said other information source/processor.

34. A method for enhancing security of certain data in an on-line information transaction comprising the steps of:

bifurcating said information transaction into a first portion comprising said certain data and a remaining portion, wherein said remaining portion is carried out via a public on-line communications connection between a terminal device and a public information server;

causing said first portion to be carried out via a secure private on-line communications connection between said terminal device and a private information server;

automatically reconfiguring network access means in said terminal device to switch between said public connection and said private connection; and automatically disconnecting said public connection prior to implementation of said private connection.

* * * * *